(12) United States Patent
Ginosar et al.

(10) Patent No.: US 8,747,673 B2
(45) Date of Patent: Jun. 10, 2014

(54) METHODS FOR RECOVERING A SOLVENT FROM A FLUID VOLUME AND METHODS OF REMOVING AT LEAST ONE COMPOUND FROM A NONPOLAR SOLVENT

(75) Inventors: Daniel M. Ginosar, Idaho Falls, ID (US); Daniel S. Wendt, Idaho Falls, ID (US); Lucia M. Petkovic, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 289 days.

(21) Appl. No.: 13/177,962

(22) Filed: Jul. 7, 2011

(65) Prior Publication Data

US 2013/0008861 A1 Jan. 10, 2013

(51) Int. Cl.
*B01D 11/00* (2006.01)
*B01D 11/04* (2006.01)
*C11B 1/10* (2006.01)

(52) U.S. Cl.
USPC ........... 210/634; 210/639; 210/774; 426/417; 426/429; 554/11; 554/12; 554/20

(58) Field of Classification Search
USPC ........ 210/634, 639, 774, 806, 808; 554/8–12, 554/20, 21, 169–174; 435/134; 426/417, 426/425, 429; 134/10, 26
See application file for complete search history.

(56) References Cited

U.S. PATENT DOCUMENTS

| | | | |
|---|---|---|---|
| 3,436,344 A | 4/1969 | Canning et al. | |
| 4,124,528 A * | 11/1978 | Modell | 210/670 |
| 4,164,506 A | 8/1979 | Kawahara et al. | |
| 4,466,923 A | 8/1984 | Friedrich | |
| 4,675,133 A * | 6/1987 | Eggers et al. | 554/8 |
| 4,695,411 A | 9/1987 | Stern et al. | |
| 4,698,186 A | 10/1987 | Jeromin et al. | |

(Continued)

FOREIGN PATENT DOCUMENTS

| | | |
|---|---|---|
| EP | 1 061 120 A1 | 12/2000 |
| JP | 63-112536 | 5/1988 |

(Continued)

OTHER PUBLICATIONS

Subramaniam et al., "Reactions in Supercritical Fluids—A Review," Industrial & Engineering Chemistry Process Design and Development, vol. 25, No. 1, Jan. 1-12, 1986.

(Continued)

*Primary Examiner* — Joseph Drodge
(74) *Attorney, Agent, or Firm* — TraskBritt

(57) ABSTRACT

A method of removing a nonpolar solvent from a fluid volume that includes at least one nonpolar compound, such as a fat, an oil or a triglyceride, is provided. The method comprises contacting a fluid volume with an expanding gas to expand the nonpolar solvent and form a gas-expanded solvent. The gas-expanded solvent may have a substantially reduced density in comparison to the at least one nonpolar compound and/or a substantially reduced capacity to solubilize the nonpolar compound, causing the nonpolar compounds to separate from the gas-expanded nonpolar solvent into a separate liquid phase. The liquid phase including the at least one nonpolar compound may be separated from the gas-expanded solvent using conventional techniques. After separation of the liquid phase, at least one of the temperature and pressure may be reduced to separate the nonpolar solvent from the expanding gas such that the nonpolar solvent may be recovered and reused.

21 Claims, 3 Drawing Sheets

(56) References Cited

U.S. PATENT DOCUMENTS

| | | | |
|---|---|---|---|
| 4,770,780 A * | 9/1988 | Moses | 210/634 |
| 4,792,418 A | 12/1988 | Rubin et al. | |
| 4,839,287 A | 6/1989 | Holmberg et al. | |
| 5,124,026 A | 6/1992 | Taylor et al. | |
| 5,219,744 A | 6/1993 | Kurashige et al. | |
| 5,242,578 A | 9/1993 | Taylor et al. | |
| 5,288,619 A | 2/1994 | Brown et al. | |
| 5,302,747 A | 4/1994 | Nelson et al. | |
| 5,424,466 A | 6/1995 | Stern et al. | |
| 5,424,467 A | 6/1995 | Bam et al. | |
| 5,480,787 A | 1/1996 | Negishi et al. | |
| 5,481,058 A | 1/1996 | Blackwell et al. | |
| 5,520,708 A | 5/1996 | Johnson et al. | |
| 5,525,126 A | 6/1996 | Basu et al. | |
| 5,578,090 A | 11/1996 | Bradin | |
| 5,599,358 A | 2/1997 | Giavazzi et al. | |
| 5,697,986 A | 12/1997 | Haas | |
| 5,713,965 A | 2/1998 | Foglia et al. | |
| 5,759,549 A | 6/1998 | Hiltunen et al. | |
| 5,783,243 A | 7/1998 | Benado | |
| 6,106,720 A | 8/2000 | Kanel et al. | |
| 6,201,144 B1 | 3/2001 | Isbell et al. | |
| 6,211,390 B1 | 4/2001 | Peter et al. | |
| 6,288,251 B1 | 9/2001 | Tsuto et al. | |
| 6,294,194 B1 | 9/2001 | Horhota et al. | |
| 6,399,800 B1 | 6/2002 | Haas et al. | |
| 6,524,469 B1 | 2/2003 | Schucker | |
| 6,537,787 B1 | 3/2003 | Breton | |
| 6,570,030 B2 | 5/2003 | Goto et al. | |
| 6,712,867 B1 | 3/2004 | Boocock | |
| 6,800,316 B1 | 10/2004 | Perrut et al. | |
| 6,884,900 B2 | 4/2005 | Maeda et al. | |
| 6,887,283 B1 | 5/2005 | Ginosar et al. | |
| 6,938,439 B2 | 9/2005 | Wilkstrom et al. | |
| 7,478,542 B2 | 1/2009 | Wilkstrom et al. | |
| 7,514,575 B2 | 4/2009 | Ginosar et al. | |
| 7,691,270 B2 | 4/2010 | Ginosar et al. | |
| 7,772,414 B1 | 8/2010 | Hybertson et al. | |
| 7,842,653 B2 | 11/2010 | Darbha et al. | |
| 8,048,462 B2 * | 11/2011 | Brunner et al. | 426/417 |
| 2004/0087809 A1 | 5/2004 | Nakayama et al. | |
| 2006/0035350 A1 | 2/2006 | Catchpole et al. | |
| 2006/0252950 A1 | 11/2006 | Ginosar et al. | |
| 2007/0012621 A1 | 1/2007 | Ginosar et al. | |
| 2007/0282119 A1 | 12/2007 | Matson et al. | |
| 2009/0178693 A1 | 7/2009 | Turner et al. | |
| 2010/0072132 A1 | 3/2010 | Ginosar et al. | |

FOREIGN PATENT DOCUMENTS

| | | |
|---|---|---|
| JP | 07-062385 | 3/1995 |
| JP | 09-157684 | 12/1995 |
| JP | 2000-270886 | 3/1999 |
| WO | 00/05327 | 2/2000 |
| WO | 00/05327 A1 | 2/2000 |
| WO | 03/089399 | 10/2003 |
| WO | 2007/032791 | 3/2007 |

OTHER PUBLICATIONS

Yahya et al., "Ester Synthesis in Lipase-catalyzed Reactions," Enzyme and Microbial Technology, vol. 23, Nos. 7-8, pp. 438-450, Dec. 15, 1998.

Yoon et al., "Transesterification between Triolein and Ethylbehenate by Immobilized Lipase in Supercritical Carbon Dioxide," Journal of Fermentation and Bioengineering, vol. 82, No. 4, 334-340, Jun. 1996.

Yu et al., "Enzymatic Esterification of Fatty Acid Mixtures from Milk Fat and Anyhydrous Milk Fat with Canola Oil in Supercritical Carbon Dioxide," Biotechnology Progress, 1992, vol. 8 No. 6, 508-513.

Yu et al., "Enzymatic Reaction in Supercritical Fluid Carbon Dioxide Using Dry-Ice," Journal of the Chinese Chemical Society, vol. 46, No. 5, pp. 647-650, Oct. 1999.

PCT International Search Report and Written Opinion of the International Searching Authority for PCT/US09/57188, dated Nov. 30, 2009, 8 pages.

Supplementary European Search Report for EP 06 75 8403, dated Apr. 7, 2010, 5 pages.

International Search Report dated Nov. 4, 1999 (2 pages).

Bernard et al., "Internal Mass Transfer Limitation During Enzymatic Esterification in Supercritical Carbon Dioxide and Hexane, Biocatalysis and Biotransformation," vol. 12, (1995) pp. 299-308.

Cernia et al. "The Role of the Reaction Medium in Lipase-catalyzed Esterifications and Transesterifications," Chemistry and Physics of Lipids, vol. 93, Nos. 1-2, pp. 157-168, Jun. 1998.

Cernia et al., "Lipases in Supercritical Fluids," Lipases PT B Methods in Enzymology, vol. 286, pp. 495-508 (1997).

Chi et al., "Enzymatic Interesterification in Supercritical Carbon-dioxide," Agricultural and Biological Chemistry, vol. 52, No. 6, pp. 1541-1550, Jun. 1988.

Colombie et al., "Water Activity Control: A Way to Improve the Efficiency of Continuous Lipase Esterification," Biotechnology and Bioengineering, vol. 60, No. 3, pp. 362-368, Nov. 5, 1998.

Demirbas, Ayhan, "Biodiesel from vegetable oils via transesterification in supercritical methanol," Energy Conversion and Management 43 (2002) 2349-2356.

Demirbas, Ayhan, "Biodiesel fuels from vegetable oils via catalytic and non-catalytic supercritical alcohol transesterifications and other methods: a survey," Energy Conversion and Management 44 (2003) 2093-2109.

Dumont et al., "Continuous Synthesis of Ethyl Myristate by Enzymatic Reaction in Supercritical Carbon Dioxide," Journal of Supercritical Fluids, vol. 6, No. 2, pp. 85-89, Jun. 1993.

Ma et al., "Biodiesel Production: A Review," Bioresource Technology, vol. 70, No. 1, pp. 1-15, Oct. 1999.

Fukuda et al., "Biodiesel Fuel Production by Transesterification of Oils," Journal of Bioscience and Bioengineering, vol. 92, No. 5, 405-416, 2001.

Gunnlaugsdottir et al., "Alcoholysis and Glyceride Synthesis with Immobilized Lipase on Controlled-pore Glass of Varying Hydrophobicity in Supercritical Carbon Dioxide," Enzyme and Microbial Technology, vol. 22, No. 5, pp. 360-367, Apr. 1998.

Gunnlaugsdottir et al., "Lipase-Catalyzed Alcoholysis with Supercritical Carbon Dioxide Extraction 2: Phase Behavior," Journal of the American Oil Chemists Society, vol. 74, No. 11, pp. 1491-1494, Nov. 1997.

Gunnlaugsdottir et al., "Process Parameters Influencing Ethanolysis of Cod Liver Oil in Supercritical Carbon Dioxide," Journal of Supercritical Fluids, vol. 12, No. 1, pp. 85-93, Mar. 15, 1998.

Habulin et al., "Synthesis of Oleic Acid Esters Catalyzed by Immobilized Lipase," Journal of Agricultural and Food Chemistry, vol. 44, No. 1, pp. 338-342, Jan. 1996.

Hrnjez et al. "Enzymatic Esterification of 1,2-Butanediol and 1,3 Butanediol in Supercritical Carbon-dioxide Reaction Rate, Regioselectivity, and Stereoselectivity as a Function of Pressure," Abstracts of Papers of the American Chemical Society 207:315-ORGN, Part 2 Mar. 13, 1994.

Hyatt, John A., "Liquid and Supercritical Carbon Dioxide as Organic Solvents," Journal of Organic Chemistry, vol. 49, No. 26, pp. 5097-5101, 1984.

Ikariya et al., "Chemical Reactions in Supercritical Fluids," Journal of Synthetic Organic Chemistry Japan, vol. 53, No. 5, pp. 358-369, May 1995.

Ikushima et al., Promotion of a Lipase-Catalyzed Esterification in Supercritical Carbon Dioxide in the Near-Critical Region, Chemical Engineering Science vol. 51, No. 11, pp. 2817-2822, Jun. 1996.

Ikushima et al., "Promotion of Lipase-catalyzed Esterification of N-Valeric Acid and Citronellol in Supercritical Carbon Dioxide in the Near-critical Region," Journal of Chemical Engineering of Japan, vol. 29, No. 3, pp. 551-553, Jun. 1996.

Ikushima, Yutaka, "Supercritical Fluids: An Interesting Medium for Chemical and Biochemical Processes, Advances in Colloid and Interface Science," vol. 71-71, 259-280, Sep. 1, 1997.

Jackson, et al., "Methanolysis of Seed Oils in Flowing Supercritical Dioxide," Journal of the American Oil Chemists Society, vol. 73, No. 3 (1996).

(56) References Cited

OTHER PUBLICATIONS

Kiran et al. "Supercritical Fluid Engineering Science Fundamentals and Applications," pp. 200-219.

Knez et al, "Enzymatic Synthesis of Oleyl Oleate in Dense Fluids," Journal of the American Oil Chemists Society, vol. 72, No. 11, Nov. 1995, pp. 1345-1349.

Knez et al., "Enzyme Catalyzed Reactions in Dense Gases," vol. 14, No. 1, pp. 17-29, Oct. 1, 1998.

Knez et al., Lipase Catalysed Esterification At High Pressure, Biotechnology and Bioengineering, vol. 9, (1994) pp. 115-121.

Krmelj et al., "Lipase-catalyzed synthesis of Oleyl Oleate in Pressurized and Supercritical Solvents," FETT-LIPID, vol. 101, No. 1, pp. 34-38, Jan. 1999.

Kusdiana et al., "Kinetics of transesterification in rapeseed oil to biodiesel fuel as treated in supercritical methanol," Fuel 80 (2001) 693-698.

Lopez-Belmonte et al., "Enantioselective Esterification of 2-Arylpropionic Acids Catalyzed by Immobilized Rhizomucor Miehei Lipase," Journal of Organic Chemistry, vol. 62, No. 6, pp. 1831-1840, Mar. 21, 1997.

March, Jerry, "Advanced Organic Chemistry, Reactions, Mechanisms, and Structure," 4th Edition, John Wiley & Sons, 1992, pp. 393-396.

Marty et al., "Comparison of Lipase-catalysed Esterification in Supercritical Carbon Dioxide and in n-Hexane," Biotechnology Letters, vol. 12, No. 1, pp. 11-16, Jan. 1990.

Marty et al., "Continuous Reaction-Separation Process for Enzymatic Esterification in Supercritical Carbon Dioxide," Biotechnology and Bioengineering, vol. 43, No. 6, pp. 497-504, Mar. 15, 1994.

Marty et al., "Kinetics of Lipase-Catalyzed Esterification in Supercritical CO2," Biotechnology and Bioengineering, vol. 39, pp. 273-280 (1992).

McDaniel et al., "Esterification of Decanoic Acid During Supercritical Fluid Extraction Employing Either Methanol-modified Carbon Dioxide or a Methanol Trap," Journal of Chromatography, vol. 858, No. 2, pp. 201-207, Oct. 15, 1999.

Mensah et al., "Adsorptive Control of Water in Esterification with Immobilized Enzymes: I. Batch Reactor Behavior," Biotechnology and Bioengineering, vol. 60, No. 4, pp. 434-444, Nov. 20, 1998.

Mesiano et al., Chemical Reviews, vol. 99, No. 2, pp. 623-633, Feb. 1999.

Michor et al., "Enzymatic Catalysis in Supercritical Carbon Dioxide: Comparison of Different Lipases and a Novel Esterase," Biotechnology Letters, vol. 18, No. 1, pp. 79-84, Jan. 1996.

Mori et al., "Biocatalytic Esterification in Supercritical Carbon Dioxide by Using a Lipid-coated Lipase," Chemistry Letters, vol. 9, 921-922, Sep. 1998.

Murakata et al., "Esterification Activity of Lipasse Entrapped in Reverse Micelles Formed in Liquefied Gas," Journal of Chemical Engineering of Japan, vol. 29, No. 2, pp. 277-281, Apr. 1996.

Nilsson et al., "Solubilities of Mehtyl Oleate, Oleic Acid, Oleyl Glycerols, and Oleyl Glycerol Mixtures in Supercritical Carbon Dioxide," Journal of the American Oil Chemists Society, JAOCS, vol. 68, No. 2, Feb. 1991, pp. 87-91.

Pasta et al., "Subtilisin-catalyzed Transesterification in Supercritical Carbon Dioxide," Biotechnology Letters, vol. 11, No. 9, pp. 643-648 (1989).

Saka et al., "Biodiesel fuel from rapeseed oil as prepared in supercritical methanol," Fuel 80 (2001) 225-231.

Sarkari et al., "Enzymatic Catalysis in Cosolvent Modified Pressurized Organic Solvents," Biotechnology and Bioengineering, vol. 65, No. 3, pp. 258-264, Nov. 5, 1999.

Savage et al., "Reactions at Supercritical Conditions: Applications and Fundamentals," Aiche Journal, vol. 41, No. 7, pp. 1723-1778, Jul. 1995.

Stamatis et al, "Studies on the Enzymatic Synthesis of Sugar Esters in Organic Medium and Supercritical Carbon Dioxide," Chemical and Biochemical Engineering Quarterly, vol. 12, No. 3, pp. 151-156, Sep. 1998.

Stransky et al., "Simple Quantitative Transesterification of Lipids," FETT-LIPID, vol. 98, No. 2, 65-71, Feb. 1996.

Subramaniam et al., "Reactions in Supercritical Fluids—A Review," Industrial & Engineering Chemistry Process Design and Development, vol. 25, No. 1, 1-12, Jan. 1986.

Vieville et al, "Esterification of Oleic Acid by Methanol Catalyzed by p-Toluenesulfonic Acid and the Cation-Exchange Resins K2411 and K1481 in Supercritical Carbon Dioxide," Industrial & Engineering Chemistry Research, vol. 32, No. 9, pp. 2065-2068, Sep. 1993.

Vija et al, "Lipase-catalysed Esterification in Supercritical Carbon Dioxide and in Hexane," Bioorganic & Medicinal Chemistry Letters, vol. 7, No. 3, pp. 259-262, 1997.

Wu et al., "Enhancement of Enantioselectivity by Altering Alcohol Concentration for Esterification in Supercritical CO2," Journal of Chemical Engineering of Japan, vol. 32, No. 3, pp. 338-340, Jun. 1999.

* cited by examiner

METHODS FOR RECOVERING A SOLVENT FROM A FLUID VOLUME AND METHODS OF REMOVING AT LEAST ONE COMPOUND FROM A NONPOLAR SOLVENT

GOVERNMENT RIGHTS

This invention was made with government support under Contract No. DE-AC07-05ID14517 awarded by the U.S. Department of Energy. The government has certain rights in the invention.

CROSS-REFERENCE TO RELATED APPLICATION

This application is related to U.S. patent application Ser. No. 12/238,225 to Ginosar et al., entitled "Methods for Recovering a Polar Solvent from a Fluid Stream Contaminated with at Least One Polar Impurity," which was filed on Sep. 25, 2008, now U.S. Pat. No. 8,308,954, issued Nov. 13, 2012, the disclosure of which is incorporated by reference herein in its entirety.

TECHNICAL FIELD

The present disclosure relates to a method of recovering a nonpolar solvent after removing at least one nonpolar compound, such as a fat, an oil or a triglyceride, from a feedstream. More specifically, embodiments of the present disclosure relate to recovering the nonpolar solvent using an expanding gas.

BACKGROUND

Biodiesel has been the subject of much investigation as an alternative for petroleum diesel fuel. As used herein, the term "biodiesel" refers to an ester-based fuel oxygenate that is derived from a biological source. The biodiesel fuel is used as an alternative for, or as an additive to, petroleum diesel fuel in automobiles or other vehicles. The biodiesel fuel is conventionally produced from a triglyceride starting material or a fatty acid starting material by a transesterification reaction or an esterification reaction, respectively. Generally, the triglyceride is reacted, or transesterified, with an alcohol to produce glycerol (also known as glycerin) and a corresponding alkyl ester of the triglyceride. Similarly, the fatty acid is reacted, or esterified, with an alcohol to produce a corresponding alkyl ester of the fatty acid. The triglyceride or fatty acid feedstock materials are available from various sources, such as from pure or used fats or oils. These fats or oils are typically hydrophobic and water-insoluble. In addition to including the triglyceride or fatty acid, the fats or oils include various impurities, such as, free fatty acids, phospholipids, sterols, water, dirt, detergents and polar compounds. These sources of the fats or oils are too viscous and their freezing points too high to be used directly as the biodiesel fuel and, therefore, the triglycerides or fatty acids are transesterified or esterified to produce the corresponding alkyl ester, which has a lower viscosity than that of the source of the feedstock material. The transesterification of the triglyceride (or the esterification of the fatty acid) is conducted with an excess of the alcohol in the presence of a catalyst. As the reaction proceeds, two phases form. One phase includes the alkyl ester and the other phase includes the glycerol. The two phases are allowed sufficient time to settle before additional processing is conducted to purify the alkyl ester from the glycerol.

Currently, most biodiesel is made from soybean oil, methanol, and an alkaline catalyst. However, there are large amounts of waste fats and oils that are unsuitable for human consumption that could be converted to biodiesel at a lower cost. The problem with processing these waste oils is that they often contain large amounts of free fatty acids that cannot be converted to biodiesel using an alkaline catalyst. These free fatty acids react with the alkaline catalyst to produce soaps that inhibit the separation of the biodiesel, glycerin, and wash water. An acid-catalyzed pretreatment with an alcohol, such as methanol, has been used to convert these high free fatty acid feedstocks to methyl esters, which do not form soaps. However, such acid-catalyzed pretreatment leaves behind acid and water, which interfere with the alkaline transesterification. The triglyceride may first be extracted from a feedstream containing polar compounds, such as free fatty acids, using a nonpolar solvent, and the purified triglyceride may then undergo base-catalyzed transesterification.

Further, in food and chemical processes some fats and oils need to have impurities such as, for example, free fatty acids, sugars, and non-oil lipids, removed to improve their quality. This too can be accomplished by extracting the nonpolar fat or oil with a solvent. The extraction process results in the formation of a fraction including the nonpolar fat or oil in the solvent.

Recovering and recycling the solvent used to extract the nonpolar compounds may be problematic. Particularly, the solvent is typically removed by distillation, evaporation, lyophilization, use of an inert gas. Since such conventional techniques consume considerable amounts of energy or use expensive and toxic compounds, efficient methods of recovering a solvent used to extract nonpolar compounds, such as triglycerides, are desired.

BRIEF SUMMARY

One embodiment comprises a method of recovering a solvent from a fluid volume. The method may include removing at least one nonpolar compound from a feedstock to form a fluid volume comprising a solvent and the at least one nonpolar compound, subjecting the fluid volume to an expanding gas at a pressure at or near a critical point thereof such that the solvent separates from the at least one nonpolar compound, removing the at least one nonpolar compound and reducing at least one of the pressure and a temperature of the expanding gas to recover the solvent.

Another embodiment comprises a method of removing at least one nonpolar compound from at least one nonpolar solvent. The method may include contacting a fluid volume comprising a nonpolar solvent and at least one nonpolar compound with an expanding gas at or near a critical point thereof to form a gas-expanded solvent comprising the nonpolar solvent and the expanding gas, separating the gas-expanded solvent from the at least one nonpolar compound and reducing at least one of a temperature and a pressure of the gas-expanded solvent such that the nonpolar solvent separates from the expanding gas.

Yet another embodiment comprises another method of recovering a solvent from a fluid volume. The method may include exposing a fluid volume comprising at least one nonpolar compound and a nonpolar solvent to an expanding gas, increasing at least one of a temperature and a pressure of the fluid volume and an expanding gas to form a gas-expanded solvent comprising the nonpolar solvent and the expanding gas and a nonpolar liquid phase comprising the at least one nonpolar compound, separating the nonpolar liquid phase from the gas-expanded solvent and reducing the pressure to separate the nonpolar solvent and the expanding gas of the gas-expanded solvent.

A further embodiment comprises a method of removing at least one compound from a nonpolar solvent. The method may include contacting a fluid volume comprising at least one compound and a nonpolar solvent with carbon dioxide in a closed system and adjusting at least one of temperature and pressure conditions in the closed system to a pressure of between about 4136.85 kPa (about 600 psia) and about 20684.27 kPa (about 3000 psia) and a temperature of between about 30° C. and about 120° C. to form a liquid phase comprising the at least one compound and another phase comprising the nonpolar solvent and the carbon dioxide.

DETAILED DESCRIPTION

Figure 1:
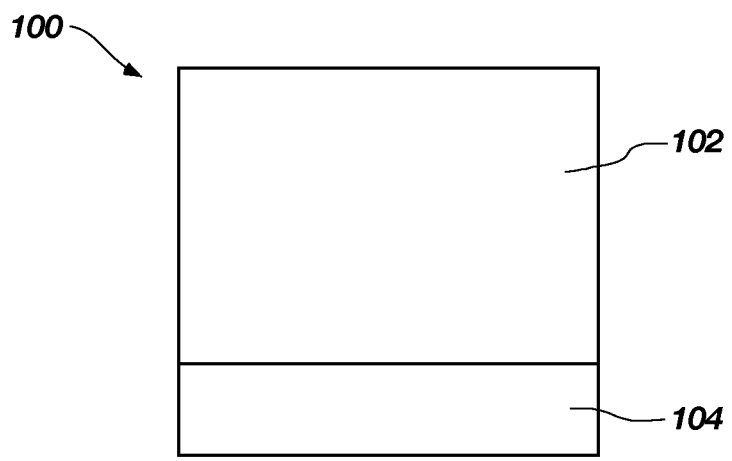
FIGS. 1-4 are schematic illustrations of an embodiment of a method for recovering a solvent contaminated with a nonpolar impurity.

An expanding gas may be used to recover a nonpolar solvent from a fluid volume including at least one nonpolar compound, such as a fat, an oil or a triglyceride. In some embodiments, a mixture of the nonpolar solvent and a polar solvent (e.g., a mixture of hexane and isopropanol) may be recovered from a fluid volume using the expanding gas. As used herein, the term "expanding gas" means and includes a fluid in a gas or liquid state capable of dissolving into a solvent and increasing a volume occupied by the solvent. The expanding gas may alter the solubility of the nonpolar compound in the nonpolar solvent, enabling recovery of the nonpolar solvent. By way of non-limiting example, recovering the nonpolar solvent from the fluid volume using the expanding gas enables recycling of the nonpolar solvent for use in the extraction of at least one nonpolar compound from feedstock volumes, such as, yellow or brown grease. While the fluid volume is described herein as a nonpolar solvent including at least one nonpolar compound, such as a fat or oil, produced as a product of the extraction process in biodiesel production, the expanding gas may be used to remove nonpolar compounds from other feedstock volumes or product volumes. For example, the expanding gas may be used to recover a nonpolar solvent from a fluid volume containing nonpolar compounds in the oil refining industry and in production of fat- or oil-based consumer products (i.e., soaps, lotions, shampoos, etc.). As further non-limiting examples, the expanding gas may be used to recover nonpolar solvents used in extracting oils from plants or seeds and nonpolar solvents used to clean fats and oils for food use.

For example, the biodiesel produced by a transesterification or esterification reaction may be an alkyl ester or mixtures thereof. An alkyl ester of a glyceride may be produced by a transesterification reaction in which an alcohol is reacted with a glyceride. Alternatively, an alkyl ester of a fatty acid may be produced by an esterification reaction in which an alcohol is reacted with a fatty acid. The chemical reaction for producing the alkyl ester from a glyceride is shown in Equation 1:

$$R_1COOR_2 + R_3OH \rightarrow R_1COOR_3 + R_2OH \quad \text{(Equation 1)}.$$

In the reaction, the organic ester, $R_1COOR_2$, is reacted with the alcohol, $R_3OH$, to produce the organic ester, $R_1COOR_3$, and the alcohol, $R_2OH$. $R_1$ may be an aliphatic hydrocarbon chain having from four to thirty-six carbon atoms. $R_2$ may be glycerol or another aliphatic hydrocarbon chain having from four to thirty-six carbon atoms. $R_2$ is linked to $R_1$ through an ester ("COO$^-$") linkage. $R_1COOR_2$ may be an acylglycerol, fat, oil, wax, or fatty acid. The acylglycerol may be mono-, di-, or tri-substituted including, but not limited to, a monoglyceride, diglyceride, or triglyceride. If $R_1COOR_2$ is a monoglyceride, diglyceride, triglyceride, fat, or oil, $R_1$ may be the aliphatic hydrocarbon ($C_4$ to $C_{36}$) chain and $R_2$ may be glycerol. If $R_1COOR_2$ is a fatty acid, $R_1$ may be the aliphatic hydrocarbon ($C_4$ to $C_{36}$) chain and $R_2$ may be hydrogen or a metal (i.e., $R_2$ is the salt of the fatty acid ($R_1COO^-M^+$)). $R_1COOR_2$ may also include a free fatty acid ($R_1COO^-$). If $R_1COOR_2$ is a wax, $R_1$ may be an aliphatic hydrocarbon chain linked to $R_2$ through the ester linkage. In one embodiment, $R_1COOR_2$ is a triglyceride, such as an animal fat, animal oil, vegetable fat, vegetable oil, or mixtures thereof. Specific examples of triglycerides include, but are not limited to, peanut oil, rapeseed oil, sesame oil, soybean oil, corn oil, sunflower oil, palm oil, palm kernel oil, coconut oil, safflower oil, olive oil, linseed oil, cotton seed oil, tung oil, castor oil, beef fat, pork fat, fish oil, rendered fat, or mixtures thereof. The triglyceride may also be obtained from waste edible oils, such as restaurant grease, household grease, waste industrial frying oil, or mixtures thereof. In another embodiment, $R_1COOR_2$ is a fatty acid, such as a saturated fatty acid, an unsaturated fatty acid, or mixtures thereof. By way of non-limiting example, fatty acids may include, but are not limited to, oleic acid, palmitic acid, stearic acid, linoleic acid, or mixtures thereof. $R_3$ may be a short-chain hydrocarbon group, which is attached to a hydroxyl group of the alcohol. $R_3$ may include, but is not limited to, a methyl, ethyl, propyl, or butyl group. The alcohol, $R_3OH$, may include, but is not limited to, methanol, ethanol, n-propanol, isopropanol, n-butanol, isobutanol, t-butanol, or mixtures thereof. The alcohol may be selected depending on the desired products of the reaction.

Nonpolar fats and oils may be recovered from feedstock volumes, such as a waste oil, especially when present in reduced quantities, using the nonpolar solvent. For example, nonpolar fats and oils can be recovered from a yellow or brown grease stream using the nonpolar solvent, such as, pentane, hexane, octane or another low molecular weight hydrocarbon solvent. In the processing or refining of commercial fats and oils, such as olive oil, corn oil, and soybean oil, nonpolar solvents may be used to clean the fats and oils. Such fats and oils may be removed from polar impurities such as free fatty acids, sugars, non-oil lipids, aflatoxin, and other components, for example, by a conventional liquid extraction process using a nonpolar solvent, such as hexane.

The nonpolar component of the feedstock volume may be a fat, oil or mixture thereof that includes polar impurities, such as, glyceride, free fatty acids, phospholipids, sterols, water, dirt, detergents, or mixtures thereof. The fat or oil may include, but is not limited to, an animal fat, animal oil, vegetable fat, vegetable oil, or mixtures thereof, such as rapeseed oil, sesame oil, soybean oil, corn oil, sunflower oil, peanut oil, palm oil, palm kernel oil, coconut oil, safflower oil, olive oil, linseed oil, cotton seed oil, tung oil, castor oil, beef fat, pork fat, chicken fat, fish oil, rendered fat, or mixtures thereof. The feedstock volume may also be obtained from waste edible oils, such as restaurant grease, household grease, waste industrial frying oil, or mixtures thereof. As a non-limiting example, the feedstock volume may include greater than or equal to about 5% by weight of free fatty acids, which are dispersed, dissolved, or emulsified in the feedstock volume. Conventional yellow grease may include greater than about 9% by weight of free fatty acids, while conventional brown grease may include greater than about 25% by weight of free fatty acids.

Nonpolar compounds, such as fats and oil, may be removed from the feedstock volume with the nonpolar solvent for use in the transesterification reaction, for example, before using the feedstock volume in the esterification reaction. By way of example and not limitation, the nonpolar solvent may include at least one of ethane, propane, butane, pentane, hexane, heptane, octane, isomers thereof (i.e., n-butane, isobutane, t-butane, n-pentane, isopentane, etc.) and benzene. The nonpolar solvent may be selected such that it has an affinity to attract the nonpolar compounds in the feedstock volume from the polar components, such as fatty acids, water and glycerides. Thus, the nonpolar solvent may extract the nonpolar compounds from the feedstock volume, forming a fluid volume that includes the nonpolar solvent and the nonpolar compounds. In this way, the nonpolar compounds (e.g., triglycerides, fats, oils, etc.) may be removed from the feedstock volume while polar impurities (e.g., fatty acids, water, etc.) may remain in the feedstock volume. For example, triglycerides, which are used for transesterification to form alkyl esters useful in the production of biodiesel, may be separated from the feedstock volume using the nonpolar solvent.

The nonpolar solvent may optionally be mixed with a polar solvent. For example, the polar solvent, such as isopropanol, may be sufficiently polar to interact with polar compounds to aid in separation of the nonpolar and polar compounds while being sufficiently nonpolar to assist in removal of the nonpolar compounds. For example, the polar solvent may include at least one of methanol, ethanol, n-propanol, isopropanol, n-butanol, isobutanol and t-butanol. The polar solvent may be selected such that it has an affinity to attract polar impurities from the nonpolar compounds, such as triglycerides, fats, and oils, in the feedstock volume.

After extraction of the nonpolar compounds from the feedstock volume, the nonpolar compounds and nonpolar solvent in the fluid volume may be separated from one another by treatment with the expanding gas. The fluid volume may be treated to recover the nonpolar solvent by contacting the fluid volume with the expanding gas. Prior to treatment with the expanding gas, the fluid volume may be maintained at ambient temperature and pressure. By way of example and not limitation, the expanding gas may include at least one of carbon dioxide, methane, ethane, propane, butane, pentane, isomers thereof (i.e., n-butane, isobutane, t-butane, n-pentane, isopentane, etc.), propylene, butylene, and pentene. The expanding gas may be in a gas phase, a liquid phase, a near critical liquid phase, or a supercritical phase as the expanding gas contacts the fluid volume containing the nonpolar solvent and the nonpolar compounds. As used herein, the term "near critical" means and includes a pressure-sensitive state that encompasses both subcritical and supercritical conditions, such as a fluid that is approaching or close to the critical phase. The expanding gas may be selected so that it has a critical phase that is obtainable under moderate temperature and pressure conditions. In other words, a critical temperature ($T_c$) and a critical pressure ($P_c$) of the expanding gas may be moderate, which enables recovery of the nonpolar solvent using low amounts of energy. For instance, the $T_c$ may be between about −20° C. and about 250° C. and the $P_c$ may be between about 1378.95 kPa (about 200 psia) and about 34473.78 kPa (about 5000 psia). As used herein, the term "psia" means and includes pound-force per square inch absolute. The expanding gas may be maintained at or near its $T_c$ and $P_c$ (i.e., at or near a critical point of the expanding gas) to recover the nonpolar solvent from the fluid volume including the at least one nonpolar compound. For example, each of the temperature and pressure may be slightly below, at, or slightly above the $T_c$ and $P_c$. The $T_c$ of the expanding gas is the temperature above which the expanding gas does not exhibit a distinct gas and liquid phase. The $P_c$ of the expanding gas is the minimum pressure needed to liquefy the expanding gas at a temperature incrementally below its $T_c$. If the expanding gas is heated to a temperature above the $T_c$ and subjected to a pressure above the $P_c$, the expanding gas is in the supercritical phase and exhibits properties that are intermediate to those of a gas or a liquid. These properties include, but are not limited to, density, viscosity, surface tension, diffusivity, and solubility. The properties of the expanding gas in the supercritical phase may be different than the properties of the same solvent in either a liquid phase or a gas phase. For instance, in the supercritical phase, the expanding gas may exhibit a viscosity that is more similar to that of a gas and a density that is more similar to that of a liquid.

Due to its high density, low viscosity, and high diffusivity, the expanding gas may be used as a solvent or as a gas antisolvent. The expanding gas may function in either the solvent or gas antisolvent capacity depending on temperature and pressure conditions at which the expanding gas is used and the chemical nature of the nonpolar compound. The concentration of the expanding gas may also affect whether the expanding gas functions as a solvent or gas antisolvent. In addition, the presence of a co-solvent(s) and its concentration may affect whether the expanding gas functions as a solvent or gas antisolvent. The expanding gas may also exhibit properties similar to its properties in the supercritical phase at temperatures and pressures that are near to the $T_c$ and the $P_c$. For instance, one or both of the temperature and pressure conditions may be slightly below each of the $T_c$ and $P_c$ as long as the expanding gas exhibits properties similar to those in the supercritical phase. Accordingly, the term "expanding gas," as used herein, also encompasses a near critical solvent having at least one of a temperature and pressure slightly below the $T_c$ and $P_c$.

With the expanding gas maintained at or near its $T_c$ and $P_c$, as described above, the expanding gas (i.e., carbon dioxide) may be introduced to the fluid volume, causing the nonpolar solvent to expand while the nonpolar compounds do not expand. As the fluid volume and the expanding gas come into contact, at least one of the temperature and pressure may be increased such that the expanding gas acts as a gas antisolvent. As the nonpolar solvent volume increases by exposure to the expanding gas, a gas-expanded solvent may form that includes a mixture of the expanding gas and the nonpolar solvent. As used herein, the term "gas-expanded solvent" means and includes a liquid in which a quantity of expanding gas is dissolved. The gas-expanded solvent may form at the interface of the expanding gas and the fluid volume. The gas-expanded solvent may be present in a liquid phase, a near critical liquid phase, or a supercritical phase. The gas-expanded solvent may form having a substantially reduced density in comparison to the nonpolar compounds and/or a substantially reduced capacity to solubilize the nonpolar compounds. As the gas-expanded solvent forms, the nonpolar compounds, which have greater densities than the gas-expanded solvent or are insoluble in the gas-expanded solvent, drop out of solution with the nonpolar solvent remaining in the gas-expanded solvent. Formation of the gas-expanded solvent results in formation of two liquid phases, a first phase including the nonpolar compounds (e.g., high density fats and oils), and a second phase including the gas-expanded solvent. The first and second phases may subsequently be separated from one another by conventional techniques, such as by liquid-gas separation, liquid-liquid separation, gravity separation, or centrifugal separation. For example, the first phase that includes the nonpolar compounds may be heavier than the second phase that includes the gas-expanded solvent. Accordingly, the first phase including the fats, oils and triglycerides may be easily separated or drained from the second phase and used in the transesterification reaction to produce alkyl esters.

After removing the first phase including the nonpolar compounds, the nonpolar solvent may be recovered by adjusting at least one of the pressure and temperature of the gas-expanded solvent such that the nonpolar solvent and the expanding gas become substantially immiscible in one another. By decreasing at least one of the pressure and temperature of the gas-expanded solvent, the nonpolar solvent may be separated from the expanding gas as a liquid phase, while the expanding gas may exhibit a gas phase. These two phases may subsequently be separated from one another by conventional techniques, such as by liquid-gas separation, liquid-liquid separation, gravity separation, or centrifugal separation. For example, the liquid phase that includes the nonpolar solvent may be heavier than the gas or liquid phase that includes the expanding gas. Accordingly, the liquid phase including the nonpolar solvent may be easily separated or drained from the gas or liquid phase and collected to be reused in extracting fats, oils and triglycerides from feedstock volumes.

The expanding gas and the nonpolar solvent including the nonpolar compounds may be contacted in a vessel. The vessel may be a batch separator or a continuous separator, and be suitably configured as a flask, a hemispherical or cylindrical vessel, a pipe, a static mixer, or an agitation vessel, as known in the art. The vessel may comprise glass, steel, stainless steel, nickel alloys, titanium alloys, glass-lined steel, polymer-lined steel, ceramic-lined steel, or mixtures thereof. As a non-limiting example, the vessel may be a cell configured to provide a closed system such that the contents of the vessel may be heated or pressurized. For instance, the vessel may be heated using a heat exchanger extending to the interior of the vessel, or by heating the vessel externally. The vessel may include an agitator used to stir the mixture of the expanding gas and the nonpolar solvent during recovery of the nonpolar solvent. The vessel may also include a port or other opening to allow for easy separation of the two immiscible phases. Accordingly, the term "volume" as used herein encompasses a defined, contained volume of fluid as well as a flowing stream of fluid.

As shown in FIG. 1, a fluid volume 104 may be introduced into a vessel 100 at ambient temperature (from about 20° C. to about 25° C.) and pressure conditions. By way of non-limiting example, the fluid volume 104 may be in the liquid phase and may include one or more nonpolar compounds (e.g., triglycerides, fats, oils, etc.) dissolved in a solvent. The solvent may be a nonpolar solvent, such as, at least one of methane, ethane, propane, butane, pentane, hexane, heptane and octane. The temperature of the fluid volume 104 may be increased to between about 30° C. and about 60° C., more particularly, to about 31° C.

An expanding gas 102 may be introduced into the vessel 100 and contacted with the fluid volume 104. As a non-limiting example, the expanding gas 102 may include at least one of carbon dioxide, methane, ethane, propane, butane, pentane, ethylene, propylene, butylene, pentene, and isomers thereof (i.e., n-butane, isobutane, t-butane, n-pentane, isopentane, 1-butene, 2-butene, isobutene, etc.). The vessel 100 may be initially maintained at ambient temperature and pressure conditions such that the fluid volume 104 and the expanding gas 102 are in separate phases. As would be understood by one of ordinary skill in the art, the change in temperature results in a change in pressure within the vessel 100. At least one of the pressure and temperature within the vessel 100 may be increased such that the expanding gas 102 enters its liquid phase, near critical liquid phase, or supercritical phase. For example, the pressure within the vessel 100 may increase as the expanding gas 102 is introduced to the vessel 100 so that the expanding gas 102 is in its pressurized gas phase, near critical gas phase, or supercritical phase. An amount of expanding gas 102 sufficient to increase the pressure to greater than or equal to a critical pressure thereof may be introduced into the vessel 100. For example, the expanding gas 102 may be carbon dioxide and may be introduced to increase the pressure in the vessel 100 to at least about 7377.39 kPa (about 1070 psia). As the pressure increases, the fluid volume 104 may dissolve into the expanding gas 102.

Figure 2:
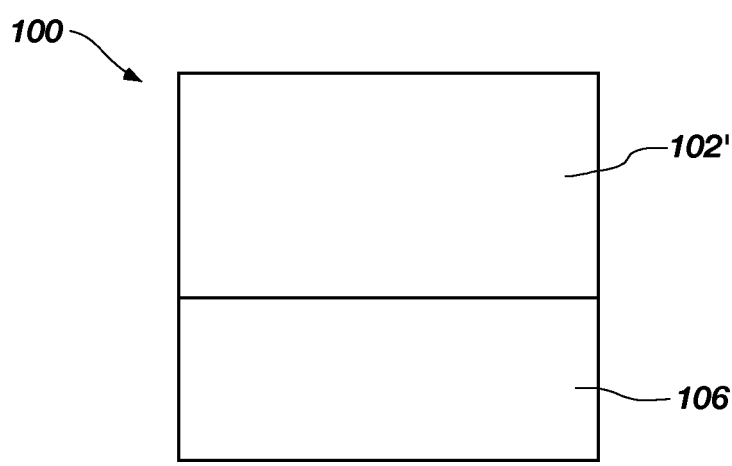

Referring to FIG. 2, as the expanding gas 102' and the fluid volume 104 combine, a gas-expanded solvent 106 may begin to form. The gas-expanded solvent 106 may include a mixture of the expanding gas 102', the fluid volume 104 including the nonpolar solvent, and the one or more nonpolar compounds and may be in its liquid phase, or near critical liquid phase. The expanding gas 102' may be continuously introduced into the vessel 100 to maintain the expanding gas 102' at or above a critical point thereof. By way of non-limiting example, to form the gas-expanded solvent 106, the pressure within the vessel 100 may be between about 7377.39 kPa (about 1070 psia) and about 7515.29 kPa (about 1090 psia) and the temperature within the vessel 10 may be between about 30° C. and about 60° C., more specifically about 35° C.

The expanding gas 102' may expand the nonpolar solvent to form the gas-expanded solvent 106 without expanding the nonpolar compounds. A volume of the nonpolar solvent increases as it dissolves the expanding gas 102' to form the gas-expanded solvent 106. A density of the gas-expanded solvent 106 may be substantially less than a density of the nonpolar compounds. As the density of the nonpolar solvent in the gas-expanded solvent 106 is reduced, the higher density, nonpolar compounds separate from the nonpolar solvent. Additionally, the solubility of the nonpolar compounds in the nonpolar solvent may be substantially reduced as the nonpolar solvent and the expanding gas 102' combine to form the gas-expanded solvent 106 such that the nonpolar compounds separate from the nonpolar solvent.

Figure 3:
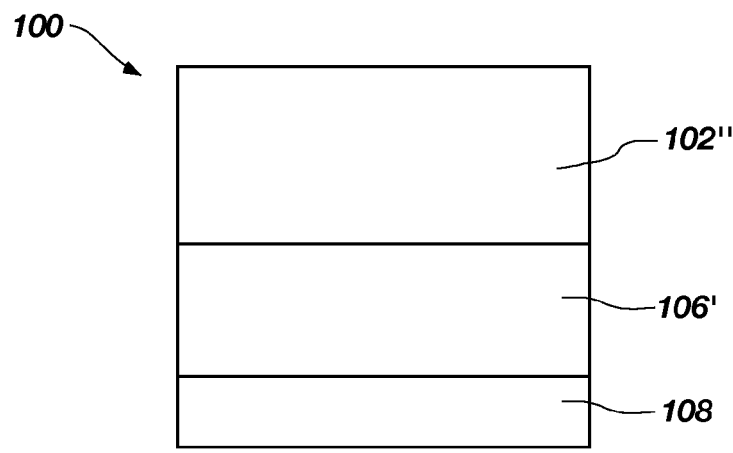

Referring to FIG. 3, as the nonpolar solvent continues to mix with the expanding gas 102" to form the gas-expanded solvent 106', the density of the gas-expanded solvent 106' and/or the solubility of the nonpolar compounds in the gas-expanded solvent 106' is further reduced and higher density and/or insoluble compounds (e.g., the nonpolar compounds) drop out of (i.e., separate from) the gas-expanded solvent 106', forming a fluid volume 108 that includes the nonpolar compounds.

By way of non-limiting example, to form the gas expanded solvent 106', the pressure within the vessel 100 may be between about 4136.85 kPa (about 600 psi) and about 20684.27 kPa (about 3000 psia), more specifically about 7377.39 kPa (about 1070 psia), and the temperature within the vessel 100 may be between about 30° C. and about 60° C., more specifically about 35° C. The pressure may be increased by introducing additional expanding gas 102" into the vessel 100. The gas expanded solvent 106' may be in an expanded liquid phase, a near critical liquid phase, or a supercritical phase. The resulting fluid volume 108 may have a substantially increased concentration of nonpolar compounds and a decreased concentration of the nonpolar solvent. The fluid volume 108 including the nonpolar compounds may be removed from the vessel 100 by conventional techniques such as by liquid-liquid separation or gravity separation. The concentrated nonpolar compounds in the fluid volume 108 may be reacted with methanol in a separate, acid-catalyzed reaction to produce biodiesel. The resulting gas-expanded solvent 106' may be substantially free of the nonpolar compounds.

Figure 4:
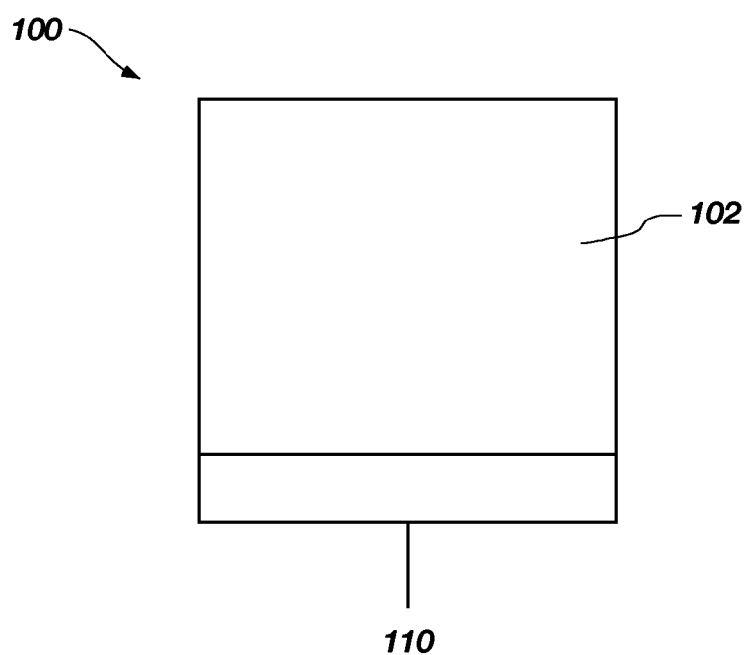

As shown in FIG. 4, after removal of the fluid volume 108, at least one of the pressure and the temperature within the vessel 100 may be decreased such that the solvent 110 and the expanding gas 102 separate into two phases. By way of non-limiting example, a decrease in pressure of between about 68.95 kPa (about 10 psia) and about 206.84 kPa (about 30 psia) within the vessel 100 may cause the solvent 110 and the expanding gas 102 to separate into two substantially immiscible phases. For example, where the expanding gas 102 is carbon dioxide, the pressure may be reduced to a pressure of less than about 6550.02 kPa (about 950 psia) at a temperature of at least about 35° C. The solvent 110 may form as a liquid phase and the expanding gas 102 may form as a gas phase. The solvent 110 may be substantially free of nonpolar compounds, such as triglycerides, fats and oils. The solvent 110 may be removed from the vessel 100 by conventional techniques, such as by gravity separation. The substantially pure solvent 110 may be recycled for use in extracting nonpolar compounds from another feedstock volume (e.g., a feedstock for use in biodiesel production).

Additionally, a decrease in temperature of between about 10° C. and about 60° C. within the vessel 100 may cause the solvent 110 and the expanding gas 102 to separate into two substantially immiscible liquid phases. For example, where the expanding gas 102 is carbon dioxide, the temperature may be reduced to less than about 30° C. at a pressure of between about 6894.76 kPa (about 1000 psia) and about 7377.39 kPa (about 1070 psia). The solvent 110 may be a nonpolar solvent and may form as a nonpolar liquid phase and the expanding gas 102 may form as a polar liquid phase or gas phase. The solvent 110 may be substantially free of nonpolar compounds, such as triglycerides, fats and oils. The solvent 110 may be removed from the vessel 100 by conventional techniques, such as by gravity separation. The substantially pure solvent 110 may be recycled for use in extracting nonpolar compounds from the feedstock volume in biodiesel production, oil refining or other processes and the expanding gas 102 may be recycled for use in separating nonpolar impurities from the solvent 110.

Figure 5:
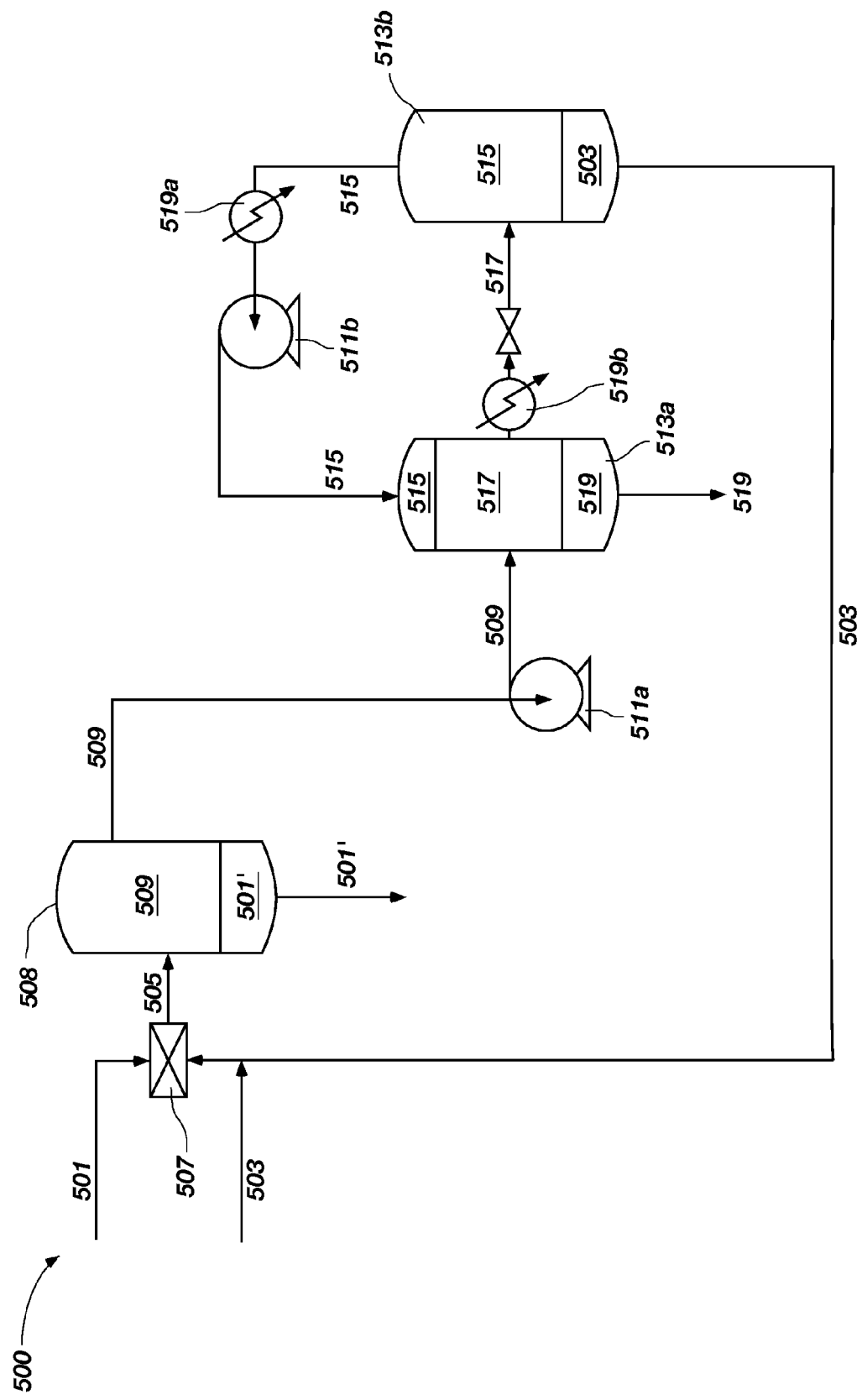
FIG. 5 is a schematic illustration of an embodiment of a continuous flow process for removing nonpolar impurities from a solvent.

FIG. 5 illustrates a continuous flow system 500 for recovering a solvent containing (i.e., contaminated with) nonpolar compounds. In the continuous flow system 500, a feedstock 501 may be combined with a solvent 503 to form a fluid stream 505 by way of a mixing device 507. The feedstock 501 may be, for example, a fat or oil including triglycerides and free fatty acids. Additionally, the feedstock 501 may include polar impurities, such as, phospholipids, sterols, water, dirt, detergents, or mixtures thereof. As a non-limiting example, the solvent 503 may be a nonpolar solvent, such as hexane or another nonpolar solvent as previously mentioned. The fluid stream 505 may be passed into a first vessel 508 wherein the nonpolar compounds dissolve into the solvent 503 from the feedstock 501 to form a fluid stream 509 that may be removed from the first vessel 508 using a conventional technique, such as gravity separation. The nonpolar compounds, such as, the fats, oils and triglycerides may be removed from the feedstock 501', while polar components remain in the feedstock 501', which is removed from the first vessel 508.

The fluid stream 509 may be directed into a phase separating vessel 513a at a desired pressure by way of a pump 511a, or any other suitable device. An expanding gas 515 may be introduced into the phase separating vessel 513a at a desired pressure and temperature. The temperature of the fluid stream 509 and the expanding gas 515 may be adjusted prior to entering the phase separating vessel 513a or may be adjusted within the phase separating vessel 513a. The expanding gas 515 may be recycled from within the continuous flow system 500 by way of a pump 511b. By way of non-limiting example, a heat exchange device 519a may be utilized to heat the expanding gas 515 to a desired temperature prior to introducing the expanding gas 515 to the phase separating vessel 513a. Within the phase separating vessel 513a, the solvent from the fluid stream 509 may dissolve into the expanding gas 515 to form, with a gas, a gas-expanded solvent 517 having a decreased saturation concentration for solubility of the nonpolar compounds. A solubility of the nonpolar compounds in the gas-expanded solvent 517 is substantially reduced. The nonpolar compounds may drop out of solution, forming a fluid stream 519 enriched with the nonpolar compounds as a lower layer in the phase separating vessel 513a, which may be continuously removed. The pressure and temperature may be increased so that the gas-expanded solvent 517 is near or above a critical point. As a non-limiting example, the expanding gas 515 may be carbon dioxide and the pressure within the phase separating vessel 513a may be between about 5515.81 kPa (about 800 psia) and about 13789.5 kPa (about 2000 psia), more specifically about 7584.23 kPa (about 1100 psia), and the temperature within the phase separating vessel 513a may be between about 30° C. and about 60° C. and, more particularly, about 35° C.

The resulting gas-expanded solvent 517 may form as an upper layer and may be substantially free of the nonpolar compounds, such as fats, oils and triglycerides. The gas-expanded solvent 517 may be directed to another phase separating vessel 513b. Another heat exchange device 519b may be employed to decrease, maintain, or increase the temperature of the gas-expanded solvent 517. At least one of the temperature and pressure may be adjusted so that the solvent 503 and the expanding gas 515 become immiscible in one another, causing the expanding gas 515 to come out of solution, forming an upper layer including the expanding gas 515 and a lower layer including the solvent 503. By way of non-limiting example, a decrease in pressure of between about 68.95 kPa (about 10 psia) and about 6894.76 kPa (about 1000 psia), within the another phase separating vessel 513b, may cause the solvent 503 and the expanding gas 515 to separate into two substantially immiscible phases. For example, where the expanding gas 515 is carbon dioxide, the pressure may be reduced to a pressure of less than about 6550.02 kPa (about 950 psia) at a temperature of at least about 35° C. Alternatively, by way of non-limiting example, a decrease in temperature of between about 0° C. and about 60° C. within the another phase separating vessel 513b may cause the solvent 503 and the expanding gas 515 to separate into two substantially immiscible liquid phases. For example, where the expanding gas 515 is carbon dioxide, the temperature may be reduced to less than about 30° C. at a pressure of greater than or equal to about 6550.02 kPa (about 950 psia).

Where the solvent 503 is a nonpolar solvent, such as hexane, the solvent 503 may form as a nonpolar liquid phase and the expanding gas 515 may form as a gas, a supercritical fluid, or a liquid phase by modifying at least one of the pressure and temperature as previously discussed. The solvent 503 may be substantially free of nonpolar compounds, such as fats, oils and triglycerides. The solvent 503 may be removed from the phase separating vessel 513b by a conventional technique, such as by gravity separation. The substantially pure solvent 503 may be recycled for use in extracting the nonpolar compounds, such as fats, oils and triglycerides, from the feedstock 501 in the continuous flow process 500.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention encompasses all modifications, variations and alternatives falling within the scope of the invention as defined by the following appended claims and their legal equivalents.

What is claimed is:

1. A method of recovering a nonpolar solvent from a fluid volume, comprising:
    removing at least one nonpolar compound from a feedstock to form a fluid volume comprising a nonpolar solvent and the at least one nonpolar compound;
    after removing the at least one nonpolar compound from the feedstock, subjecting the fluid volume to an expanding gas at a pressure at or near a critical point thereof such that the nonpolar solvent and the expanding gas form a gas-expanded solvent comprising the nonpolar solvent and the expanding gas and such that the nonpolar solvent separates from the at least one nonpolar compound;
    removing the at least one nonpolar compound from the gas-expanded solvent comprising the nonpolar solvent and the expanding gas; and
    reducing at least one of the pressure and a temperature of the expanding gas to recover the nonpolar solvent.

2. The method of claim 1, wherein removing at least one nonpolar compound from a feedstock comprises extracting at least one of a triglyceride, a fat, and an oil from the feedstock.

3. The method of claim 2, wherein extracting the at least one of a triglyceride, a fat and an oil from the feedstock comprises contacting the feedstock with at least one of methane, ethane, propane, butane, pentane, hexane, heptane and octane.

4. The method of claim 1, wherein:
    removing at least one nonpolar compound from a feedstock to form a fluid volume comprising a nonpolar solvent and the at least one nonpolar compound comprises subjecting the feedstock to the nonpolar solvent to form the fluid volume comprising the nonpolar solvent and the at least one nonpolar compound; and
    subjecting the fluid volume to an expanding gas at a pressure at or near a critical point thereof comprises expanding the nonpolar solvent with the expanding gas to reduce a density of the nonpolar solvent relative to the at least one nonpolar compound.

5. The method of claim 1, wherein subjecting the fluid volume to an expanding gas at a pressure at or near a critical point thereof comprises expanding the nonpolar solvent with the expanding gas to reduce a solubility of the at least one nonpolar compound in the nonpolar solvent.

6. The method of claim 1, wherein reducing at least one of the pressure and a temperature of the expanding gas to recover the nonpolar solvent comprises reducing the at least one of the pressure and the temperature of the expanding gas to less than or equal to the critical point thereof.

7. A method of removing at least one nonpolar compound from at least one nonpolar solvent, comprising:
    contacting a fluid volume comprising a nonpolar solvent and at least one nonpolar compound with an expanding gas at or near a critical point thereof to form a gas-expanded solvent comprising a quantity of the expanding gas dissolved in the nonpolar solvent and to form another fluid volume comprising the at least one nonpolar compound;
    separating the gas-expanded solvent from the another fluid volume comprising the at least one nonpolar compound; and
    reducing at least one of a temperature and a pressure of the gas-expanded solvent such that the nonpolar solvent separates from the quantity of the expanding gas that was dissolved in the nonpolar solvent.

8. The method of claim 7, wherein contacting a fluid volume comprising a nonpolar solvent and at least one nonpolar compound with an expanding gas at or near a critical point thereof to form a gas-expanded solvent comprises contacting the fluid volume with an expanding gas comprising carbon dioxide at or near a critical point thereof to form the gas-expanded solvent.

9. The method of claim 7, wherein contacting a fluid volume comprising a nonpolar solvent and at least one nonpolar compound with an expanding gas at or near a critical point thereof to form a gas-expanded solvent comprises forming a gas-expanded solvent having at least one of a substantially reduced density and a reduced solubility of the at least one nonpolar compound in comparison to the nonpolar solvent.

10. The method of claim 8, wherein contacting the fluid volume with an expanding gas comprising carbon dioxide at or near a critical point thereof comprises contacting the fluid volume with the expanding gas comprising the carbon dioxide at a pressure of between about 1378.95 kPa and about 6894.76 kPa.

11. The method of claim 7, wherein separating the gas-expanded solvent from the another fluid volume comprising the at least one nonpolar compound comprises separating the gas-expanded solvent from at least one of a fat, an oil, and a triglyceride.

12. The method of claim 8, wherein reducing at least one of a temperature and a pressure of the gas-expanded solvent such that the nonpolar solvent separates from the quantity of the expanding gas that was dissolved in the nonpolar solvent comprises reducing the temperature of the gas-expanded solvent to less than or equal to about 30° C. such that the nonpolar solvent separates from the expanding gas comprising the carbon dioxide.

13. The method of claim 7, wherein reducing at least one of a temperature and a pressure of the gas-expanded solvent such that the nonpolar solvent separates from the quantity of the expanding gas that was dissolved in the nonpolar solvent comprises reducing the pressure of the gas-expanded solvent to less than about 6550.02 kPa such that the nonpolar solvent separates from the expanding gas comprising the carbon dioxide.

14. A method of recovering a solvent from a fluid volume, comprising:
    exposing a fluid volume comprising at least one nonpolar compound and a nonpolar solvent to an expanding gas;
    increasing at least one of a temperature and a pressure of the fluid volume and the expanding gas to form a gas-expanded solvent comprising the nonpolar solvent and the expanding gas and a nonpolar liquid phase comprising the at least one nonpolar compound;
    separating the nonpolar liquid phase comprising the at least one nonpolar compound from the gas-expanded solvent; and reducing the pressure of the gas-expanded solvent to separate the nonpolar solvent and the expanding gas of the gas-expanded solvent.

15. The method of claim 14, wherein:

exposing a fluid volume comprising at least one nonpolar compound and a nonpolar solvent to an expanding gas comprises exposing the fluid volume to an expanding gas comprising carbon dioxide; and increasing at least one of a temperature and a pressure of the fluid volume and the expanding gas to form a gas-expanded solvent comprises increasing the temperature from between about 30° C. and about 60° C. and maintaining the pressure between about 5515.81 kPa and about 13789.5 kPa to form the gas-expanded solvent comprising the nonpolar solvent and the carbon dioxide.

16. The method of claim 14, wherein:

exposing a fluid volume comprising at least one nonpolar compound and a nonpolar solvent to an expanding gas comprises exposing the fluid volume to an expanding gas comprising carbon dioxide; and increasing at least one of a temperature and a pressure of the fluid volume and the expanding gas comprises increasing the pressure of the fluid volume and the expanding gas comprising the carbon dioxide to about 6894.76 kPa at a temperature of about 35° C.

17. The method of claim 14, wherein:

exposing a fluid volume comprising at least one nonpolar compound and a nonpolar solvent to an expanding gas comprises exposing the fluid volume to an expanding gas comprising carbon dioxide; and reducing the pressure of the gas-expanded solvent to separate the nonpolar solvent and the expanding gas of the gas-expanded solvent comprises reducing the pressure within a closed system to less than or equal to about 6550.02 kPa at a temperature of about 35° C. to separate the nonpolar solvent and the expanding gas comprising the carbon dioxide.

18. A method of removing at least one nonpolar compound from a nonpolar solvent, comprising:

contacting a fluid volume comprising at least one nonpolar compound dissolved in a nonpolar solvent with carbon dioxide in a closed system; and adjusting at least one of temperature and pressure conditions in the closed system to a pressure of between about 5515.81 kPa and about 13789.5 kPa and a temperature of between about 30° C. and about 60° C. to form a liquid phase and another phase, the liquid phase comprising the at least one nonpolar compound from the fluid volume, and the another phase comprising the nonpolar solvent from the fluid volume and the carbon dioxide.

19. The method of claim 18, further comprising removing the liquid phase from the closed system.

20. The method of claim 18, further comprising reducing the pressure within the closed system to less than about 6550.02 kPa to render the nonpolar solvent and the carbon dioxide substantially immiscible.

21. The method of claim 18, further comprising separating the nonpolar solvent from the carbon dioxide.

* * * * *